Aug. 7, 1928.  1,679,718
T. HALL
PROJECTOR LAMP
Filed April 30, 1920  3 Sheets-Sheet 1
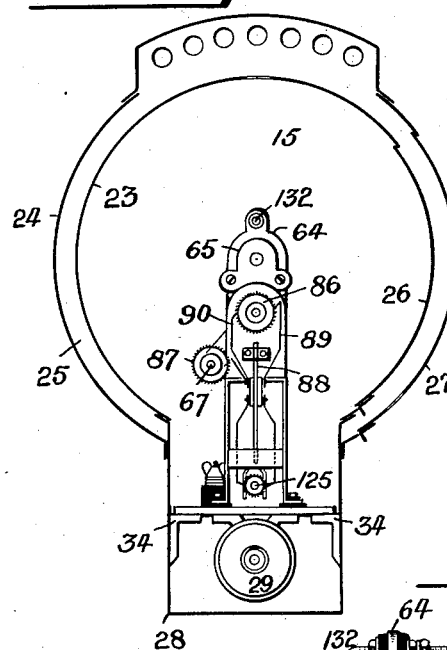
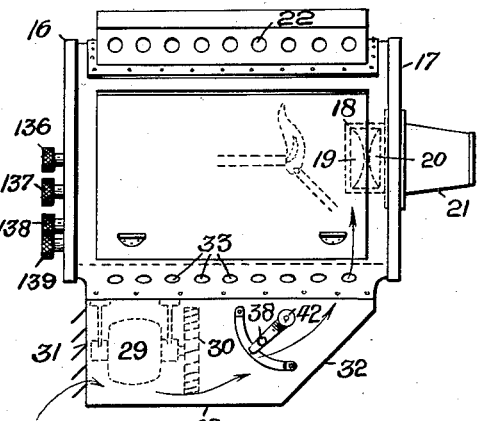
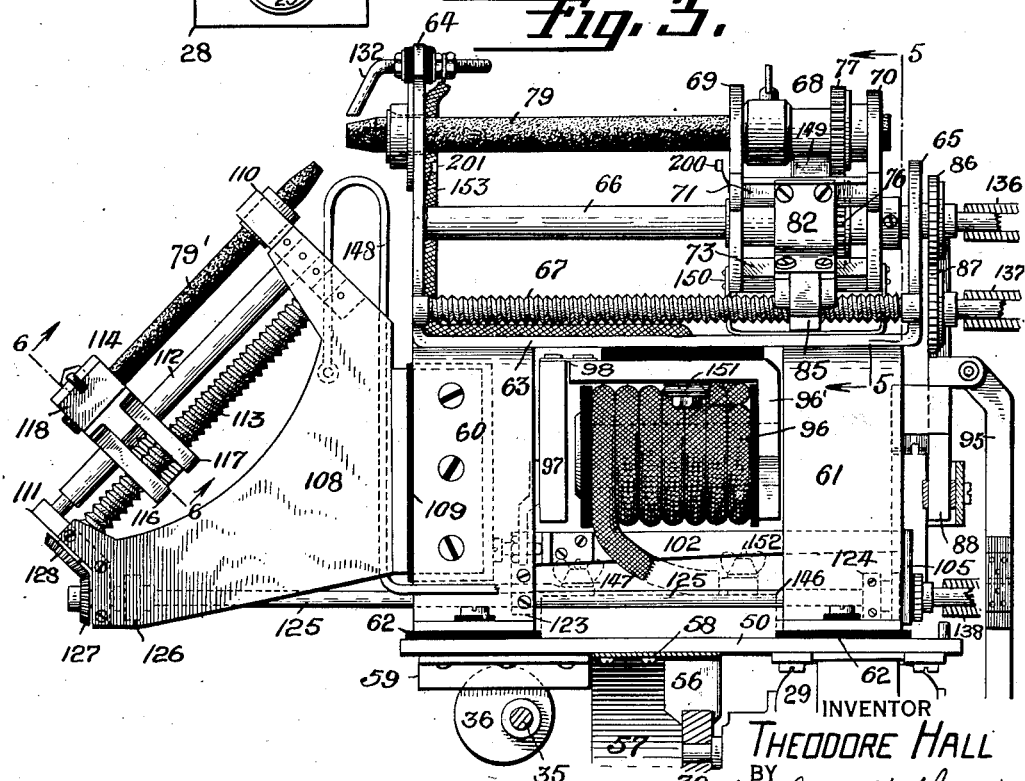
INVENTOR
THEODORE HALL
BY
Herbert H. Thompson
HIS ATTORNEY Aug. 7, 1928.
T. HALL
1,679,718
PROJECTOR LAMP
Filed April 30, 1920. 3 Sheets-Sheet 2
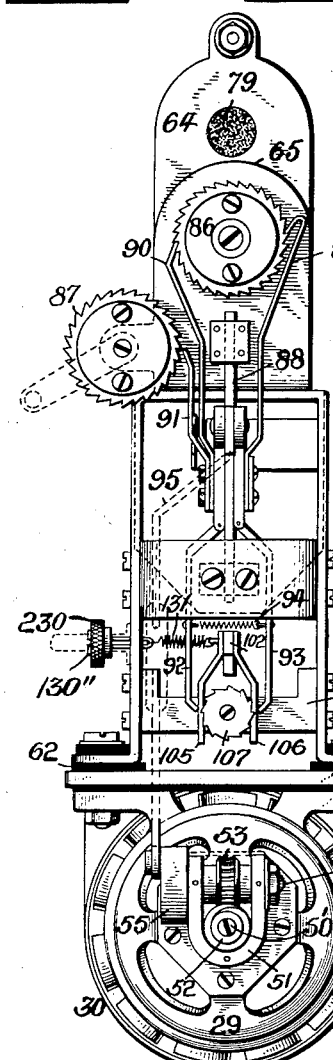
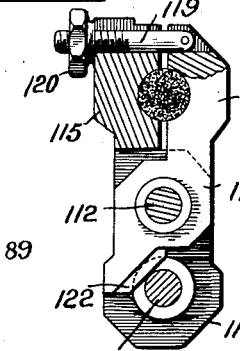
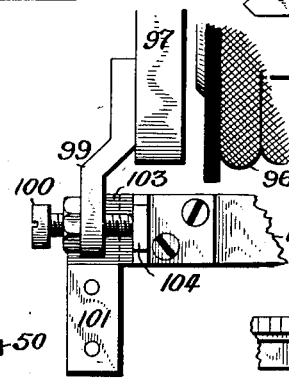
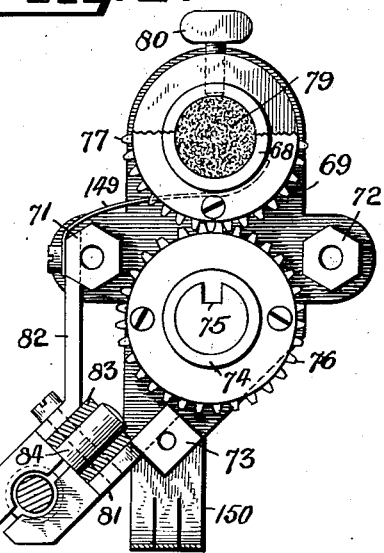
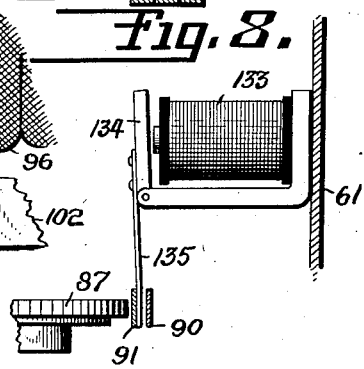
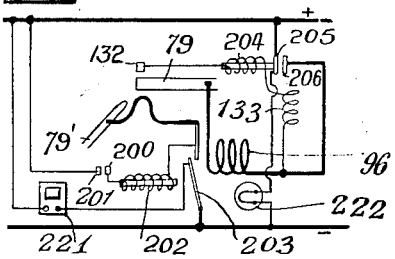
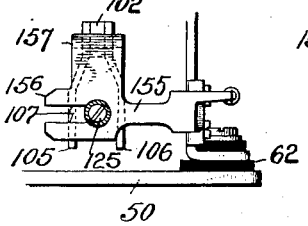
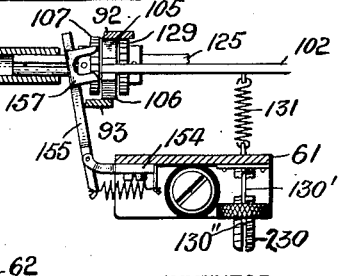
INVENTOR
THEODORE HALL
BY
Herbert H. Thompson
HIS ATTORNEY.

Aug. 7, 1928.
T. HALL
1,679,718
PROJECTOR LAMP
Filed April 30, 1920   3 Sheets-Sheet 3
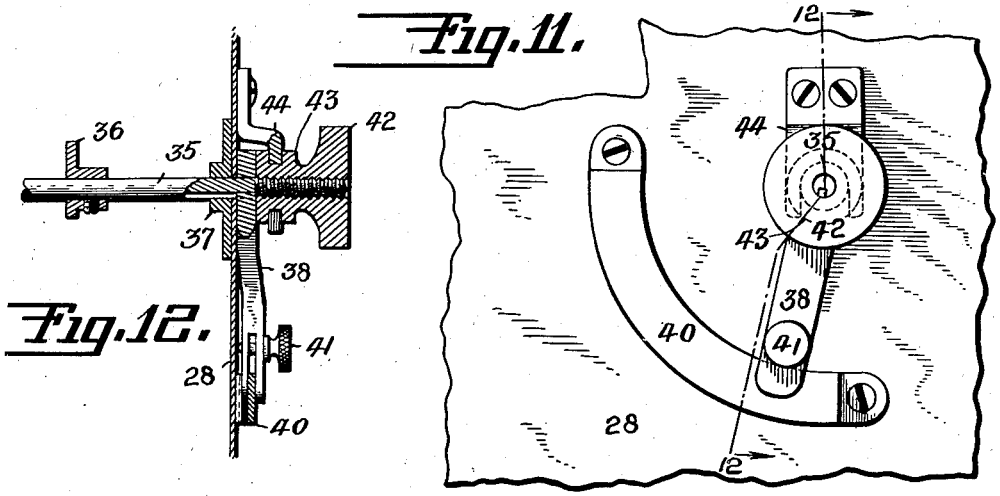
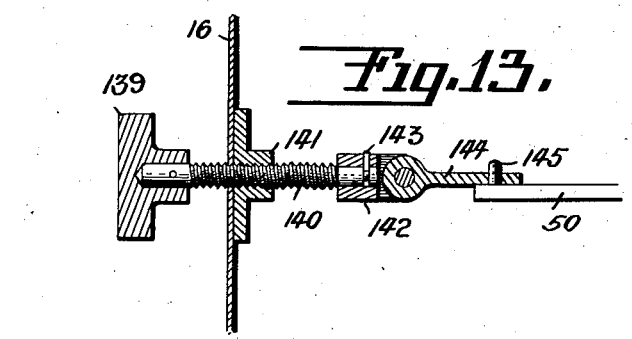
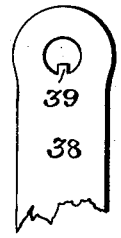
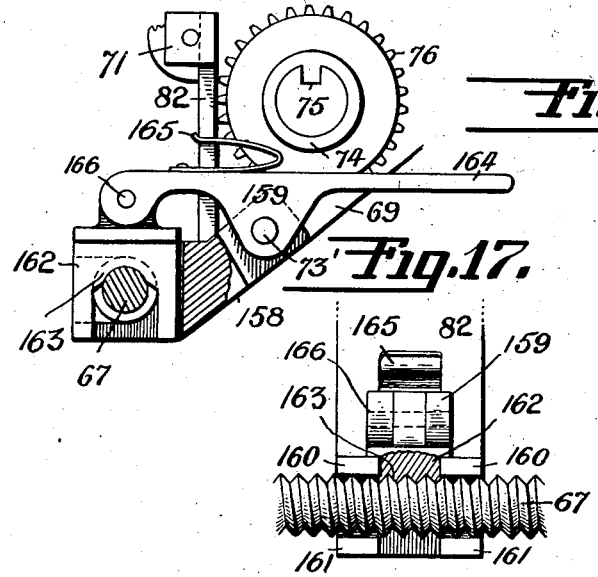
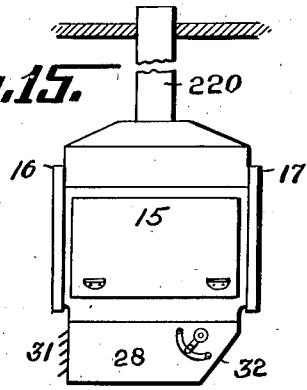
INVENTOR
THEODORE HALL
BY
Herbert H. Thompson
his ATTORNEY Patented Aug. 7, 1928.

1,679,718

UNITED STATES PATENT OFFICE.

THEODORE HALL, OF BROOKLYN, NEW YORK, ASSIGNOR TO THE SPERRY GYROSCOPE COMPANY, OF BROOKLYN, NEW YORK, A CORPORATION OF NEW YORK.

PROJECTOR LAMP.

Application filed April 30, 1920. Serial No. 377,743.

This invention relates to the class of high power arc lamps, and more particularly to that variety which is adapted to both automatic and hand feeding or adjustment of both electrodes to maintain a proper arc length between the electrodes and a predetermined position of principal light source.

The object of the invention is to produce a lamp, the mechanism of which will be small, compact, and efficient, especially light in weight, with all its parts so arranged as to be readily accessible, without in any way sacrificing any of its sensitive automatic focusing or other control devices.

Another object of the invention is to provide such a lamp with all its necessary operating mechanism within the confine of a housing, in this particular instance designed to be operated for projecting moving pictures upon a screen or for direct flood lighting, all of the lamp operating mechanism and lenses being arranged within the lamp house.

A further object of the invention is to provide a lamp housing which will contain the operating mechanism for the lamp and the lenses for focusing or concentrating a beam of light without shadow, which is adapted for use on any existing projecting machine now in use.

Other objects will be pointed out as to the mechanism and operation in the description and more particularly in the claims.

Referring to the drawings wherein I have shown what is now considered to be the preferred form of my invention:

Fig. 1 is a diagrammatic rear view of the lamp provided with my improved mechanism, parts removed for the purpose of clearness.

Fig. 2 is a side view of the lamp housing, showing the approximate position and arrangements of the motor, fan, flame, and lenses in dotted lines.

Fig. 3 is an enlarged side view of the positive and negative electrodes with their supporting and operating mechanism.

Fig. 4 is an enlarged rear view of the feeding mechanism, the operating link between the motor and the main feeding bar is shown in dotted lines.

Fig. 5 is an enlarged transverse section taken on line 5—5, Fig. 3, looking in the direction of the arrow.

Fig. 6 is an enlarged transverse sectional view taken on line 6—6, Fig. 3, looking in the direction of the arrow.

Fig. 7 is a detail showing the magnet control of the feed of the negative carbon.

Fig. 8 is a detached diagrammatic detail showing a means for operating and releasing a pawl from its ratchet.

Fig. 9 is an end elevation of a device for throwing out the automatic feed.

Fig. 10 is a detail plan view of the same showing the latch out of engagement with the automtaic feeding means.

Fig. 11 is a face view of the lamp aligning device.

Fig. 12 is a vertical sectional view of the same on line 12—12, Fig. 11, looking in the direction of the arrow.

Fig. 13 is a detail showing the means by which the lamp is properly adjusted with respect to the lenses.

Fig. 14 is a detached detail showing the lever locking means.

Fig. 15 is a detail showing connections for conveying fumes, etc., from the booth.

Fig. 16 is a detail modification showing means for releasing the positive carbon carriage from its feed screw, parts broken away to show operating means.

Fig. 17 is a detail front view of the same showing the operating jaw of the feed nut partly in section.

Fig. 18 is a wiring diagram of the invention.

Referring particularly to Figs. 1 and 2, the housing 15 is provided with a rear wall 16, front wall 17 adapted to hold in position a frame 18, which securely holds condensers or lenses 19 and 20 therein for focusing the flood of light through the projecting tube 21 into the picture operating mechanism, which latter mechanism forms no part of the present invention and is not shown herein. The housing or drum 15 is provided with ventilating openings 22 at its upper part for the exhaust of the fumes or products of combustion from the lamp. As shown the housing is composed of an inner and outer shell 23 and 24, forming about the sides thereof an air chamber 25. Suitable doors 26 and 27 are provided for the placing and removing of the lamp mechanism therein. Below the housing or drum 15 is provided an extension 28, the latter forming a housing for the motor 29 and fan 30. The rear of the extension is provided with air inlets 31 while the forward part may be provided with an incline 32 which assists or guides the current of air upwardly, thereby furnishing air to cool the condensers 19 and 20 as well as the lamp mechanism. The housing may be provided with vents 33 so as to furnish a sufficient quantity of air to the inside of the housing for keeping the temperature therein sufficiently low.

Secured to the inner face of the extension 28 are ledges 34 on which the plate carrying the lamp mechanism rests, while to the outer face just below the ledge 34 is a transverse shaft 35 extending across the compartment and carrying thereon an eccentric 36 which, when the lamp is in position within the housing, regulates the light with respect to the lenses thereof. The said shaft operates within suitable bushings 37 (see Figs. 11 and 12) carried by the side of the extension and on one side extends through the same. On said shafts is an arm 38 the hub of which is provided with a key 39 that fits in a keyway in said shaft 35, while the outer end of such lever is bifurcated to straddle a segmental guide 40 to which such lever may be secured when such eccentric has been finally adjusted by means of screw 41. The outer end of the shaft 35 is threaded to carry thereon a large knurled knob 42 provided with a hub with two collars 43 while between such collars is a forked bearing 44 which is secured to the side of the extension 28.

The lamp operating mechanism is shown as secured to a base or supporting plate 50, to the under side of which is suitably secured the electric motor 29. The shaft 50' of said motor at its outer end is provided with a suitable housing 51 within which operates a worm 52, while meshing with the same is a worm wheel 53 carried by a shaft 54, on one end provided with a crank disc 55, the connections of such disc with the feeding mechanism being hereinafter explained. To the opposite end of the motor shaft, as has been noted, is secured a fan 30, the blades 56 of which are confined within a guard 57 which is held securely to the base plate 50 by screws 58. Forward of the fan and centrally located are secured a slotted bearing and guide 59, between the depending walls of which the eccentric 36 extends, to raise the lamp mechanism up or down by means of the movement of the lever 38 or to move the said mechanism to the right or left by means of the knurled knob 42 for focusing the lamp.

To the upper face of the plate 50 are secured two upwardly extending braces 60 and 61 which are separated from the plate 50 by insulation 62, while to the top of the braces is secured another plate 63 provided with upward extensions 64 and 65 which support in suitable bearings a slotted guide bar 66 and the threaded feed shaft 67. The bar 66 sustains and guides a carriage 68 which may be composed of front and rear plates 69 and 70 having suitable extensions or spacing bars 71, 72, and 73 (see Fig. 5). The carriage may be provided with a sleeve 74 which surrounds the guide bar 66 and is provided with a key 75 to fit into the keyway in the guide bar. On the outside of the sleeve is secured a gear 76. A similar gear 77 mounted on a sleeve 68 surrounding the positive carbon 79 meshes with said gear 76 to rotate the same. In an enlargement on said sleeve 68 is a thumb screw 80 whereby the carbon is securedly locked to said sleeve so as to both rotate and move longitudinally therewith. To the extension 73 is secured an arm 81, while from the extension 71 is a like arm 82, both of which are secured to a block 83 provided with a center bore into which stem 84 of a split threaded nut 85 fits. The guide bar 66 extends beyond the rear extension 70 and is provided with a ratchet wheel 86 or the like. Likewise the threaded feed bar 67 also extends outwardly and is provided with a second ratchet wheel 87.

Positioned to the rear of and below the above described mechanism is a reciprocating bar or operating member 88 to the upper part of which is secured a plurality of pawls 89, 90, and 91 the pawls 89 and 90 operating ratchet wheel 86 on both reciprocations of the bar, while pawl 91 is disengaged from ratchet wheel 87 and is only thrown into engagement therewith when the carbon is to be fed forward by means hereinafter described. Hinged to said reciprocating bar 88 are two additional pawls 92 and 93, a spring 94 at all times exerting tension on both pawls no matter which one is acting. As above noted, the worm 52 rotates the crank disc 55 which is connected by a pitman 95 to member 88 to reciprocate the same and from which the several pawls operate their respective ratchets. It will thus be seen that while I perform at least three functions from the same member (88), each movement may be independently controlled by governing the engagement of the various pawls with their respective ratchets.

For controlling the feed of the negative electrode I have shown an electromagnet or solenoid 96 preferably in series with the arc and carried on a bracket 96' which carries at its forward end an armature 97 provided with a spring hinge 98 at its upper end and with an extending arm 99 (Fig. 7). Said arm is provided with a set screw 100 for proper adjustment. Across the bracket 60 is a brace 101 having hinged thereto a lever 102, said lever having a spring hinge 103 and an angular projection 104 against which the screw 100 bears to move said lever laterally one way or another when energization of the magnet varies. To the forward end of said lever are secured two arms 105 and 106 which operate just behind the ratchet 107.

Referring now to the negative holder, as shown in Fig. 3, it will be seen that extending forwardly of the main support is an arm 108 which is insulated at 109 from the bracket 60 and is provided with suitable bearings 110 and 111 into which is fitted a guide bar 112 and a threaded feed bar 113. The carriage 114 may be provided with one jaw 115 having two downwardly extending arms 116 and 117 which surround the guide bar 112 and the feed bar 113 while the jaw 118 on its upper end is provided with a hinged screw 119 adapted to be thrown over the forked fingers of the jaw 115 and with nut 120, which not only holds the two parts together but also clamps the negative carbon 121 therein. The lower part of the jaw 118 has a central hub part 119 that surrounds the guide bar 112 but carries thereon a depending part provided with teeth 122, which teeth are adapted to fit the threads of the feed bar 113 to cause the carriage to move forward and backward as may be necessary in the proper operation of the lamp. The carriage 114 when unlocked by the screw and nut may be quickly adjusted to any point desired, then locked again in the operative position. To the lower part of braces 60 and 61 are secured bearings 123 and 124 which support shaft 125, the latter being provided with an insulation section 126 at its forward end. The shaft 125 is also provided with a gear 127 which meshes with a like gear 128 on the feed bar, while on the opposite end of said shaft 125 are two oppositely cut ratchets 107 and 129. Between these two ratchets the arms 105 and 106 extend. Adjustment is obtained by means of a nut 130 threaded on slotted screw 230. A U-shaped loop 130' with overturned ends 130" extending through said slot and bearing against the nut supports the end of spring 131. Any desired amount of tension may thus be applied on the spring 131 to hold the said lever 102 to the left, thus causing the pawl 93 to operate the ratchet 107 on every reciprocation of the operating member 88 by reason of the arm 105 keeping its pawl 92 away from its ratchet 129. Thus it will be seen that when the solenoid 96 is strongly energized the lever 102 will be thrown to the opposite side toward which the spring 131 is exerting its tension and thereby cause the shaft 125 to revolve in a counterclockwise direction by reason of the pawl 92 engaging ratchet wheel 129 and in like manner when the solenoid is deenergized the spring 131 holds said lever to the left (Fig. 4) and there results a clockwise rotation of the shaft 125 and a forward movement of the carriage 114 of the negative electrode to feed the same so as to maintain the proper arc length. No feed takes place when the two arms are in the central position, as shown in Fig. 4, which condition arises when the magnetic flux of magnet 96 is just sufficient to balance the force of spring 131.

The positive feed is entirely independent and is preferably governed by a means responsive to the position of the positive crater. For this purpose I make use of what is known as a "third" electrode operating on the principle more fully described in my copending Patent No. 1,625,315, dated April 19, 1927, for flaming arc floodlights. To the top of the extension 64 such third electrode 132 is shown as secured by means of a screw and nut which enables it to be adjusted to compensate for wear, etc. Secured to the brace 61 is an electromagnet 133 having an armature 134 provided with a rearwardly extending finger 135 which extends between the pawls 90 and 91 (see Fig. 8). When such magnet is energized by reason of the approach of the arc flames to the third electrode, as described in said application, armature 134 causes the finger 135 to push pawl 91 into contact with the ratchet wheel 87 and thereby cause the positive carbon to be fed forward.

While the mechanism above described is adapted for automatic action yet I prefer to provide means whereby the same results may be attained to the same degree by means of hand manipulation. As shown in Fig. 2, knob 136 is adapted to be attached to the guide bar 66 for turning independently the positive carbon should the same be desired for any purpose. Knob 137 is secured to the feed bar 67 for the purpose of adjusting the positive carbon in its proper position, while knob 138 is for a like purpose for properly positioning the negative carbon. Still another adjustment for the lamp may be provided by means of knob 139 for positioning the lamp mechanism proper. As shown in Fig. 13, the threaded stem 140 of the knob extends through a threaded bushing 141 and is provided with a collar 142 which latter is secured to the stem by a pin 143. Hinged to the collar is an arm 144 through which is a hole that fits over a pin 145 on the plate 50. Thus it is seen that from the exterior of the housing of the lamp any and all necessary adjustments may be made.

A suitable insulation block 146 (shown in dotted lines Fig. 3) is provided for the terminals of the various circuits. To post 147 is secured the lead wire 148 which comes within a short distance of the ends of the two carbons, where it is bent downwardly and secured to the extension 108. By leading a conductor up close to the arc in such a manner as to have a portion thereof substantially parallel to the direction of current passage through the arc, a deflecting influence upon the flame is secured, steadying the arc, and rendering it possible to employ a less steep angle for the negative than would otherwise be necessary for proper burning conditions.

The carriage carrying the positive carbon is provided with spring contact 149 which leads the current to the hub 78 and electrodes 79 from the carriage proper. Said carriage may be provided with a sliding spring contact 150 bearing on plate 63 from where current is led to a terminal 151 through series coil 96 and thence back to the other post 152. The third electrode 132 is connected by a wire 153 which is in circuit with magnet 133 while its other terminal is connected to said post 152. Of course, it will be understood that the motor 29 for driving the fan and other devices of the lamp derives its power from the two posts 147 and 152.

In Figs. 9 and 10 is shown a means for hand feeding the negative carbon 121, wherein 154 is a bracket secured to the extension brace 61 and hinged thereto is a spring pressed lever 155 having its outer end forked as at 156 to fit about the shaft 125, and also provided with an upwardly extending part 157 bifurcated so as to hold securely between the prongs of the same the end of the lever 102 with its two depending fingers 105 and 106. The knob 138 is provided with a stem with such means as not only to connect with and turn shaft 125, but the hub on the stem is caused to push the lever 155 inwardly and thereby held the two pawls 105 and 106 out of contact with their respective ratchets 107 and 129, thereby permitting the knob 138 to turn and operate the negative carbon in any way that may be desired.

Referring to Figs. 16 and 17, a modification of the feeding mechanism of the positive carbon 79 is illustrated. The brace bar 73' is provided with an extension 158 that extends forward and surrounds the feed bar 67, while also on the same brace 73' is suitably pivoted a lever 159. The extension 158 has two sets of fingers, 160 and 161, between which a nut 162 operates. Said nut is provided with teeth 163 in its upper part that engages the screw threads of the feed 67 and causes the carriage to feed forward or backward. When it is desired for any purpose to release the carriage from the feed the handle 164 is depressed by compressing spring 165 and causing the operating nut to become disengaged from the feed for purposes of moving the carriage forward or backward without being obliged to operate the knurled handle 136. The lever 159 and nut 162 are connected by a pin 166. By this construction it will be readily seen that both the negative and positive carbons are carried by their respective carriages and that each may be independently moved without respect to their respective feed bars.

In addition to the hereinbefore described mechanism I prefer to equip the lamp with means for protecting the third electrode from damage in case the positive electrode burns back too far thereby permitting the same to become immersed in the intensely hot arc flames. As the third electrode is preferably made of copper or other metal of good conducting properties it will readily be seen that if the flame comes too close to the electrode it will fuse and burn the same and ultimately destroy the controlling mechanism. Such a condition may be brought about by several circumstances such as (1) consumption of the positive carbon down to a point where the carriage 69 strikes the forward upright support 64 thereby preventing any further forward feed; and (2) a disarrangement of the feeding mechanism so that the positive fails to feed forward or so that the negative feeds forwardly too far. Accordingly I prefer to provide special means to prevent such damage, the same being diagrammatically illustrated in the wiring diagram Fig. 18. Said figure also illustrates the preferred connections for the arc itself showing the series coil 96, the third electrode coil 133, and the positive and negative electrodes 79 and 79'. For the above described purposes I may provide on carriage 68 a contact 200 adapted to engage a contact 201 on the upright 64 when the carriage 69 approaches the limit of its movement. Such contacts are in circuit with a high resistance electromagnet 202 adapted to open the main circuit of the arc by means of circuit breaking switch 203. When said contacts are closed the switch 203 will be snapped open, thereby furnishing a signal to the operator by extinguishing the arc. If desired the opening of switch 203 may furnish some other signal to the operator, such as sounding a bell or buzzer, energizing an incandescent light, or the like. In Fig. 18, for example, is shown a buzzer 221 connected to the positive main and to a contact adjacent circuit breaker 203. When the latter is moved to its open position it engages the aforesaid contact, as shown, thus connecting the buzzer 221 across the positive and negative mains. It should be noted that preferably at the same time the circuit thru coil 202 is broken. Another means for extinguishing the arc and thus informing the operator when the arc approaches the third electrode too closely may comprise an electromagnet 204 in circuit with said third electrode, said electromagnet being adapted when strongly excited, to open contacts 205 and 206 in the main arc circuit. If desired, the said electromagnet 204 and contacts 205, 206 may be employed in addition to magnet 202 and switch 203, as shown. The separation of contacts 205 and 206 may, if desired, furnish some other signal to the operator. By way of example I have shown an incandescent lamp 222 connected to the negative main and to a contact adjacent the contact 205, whereby, when the latter is retracted by magnet 204 it engages the said contact to which the lamp 222 is connected. Since contact 205 is connected to the positive main, the lamp 222 is thereby connected across the positive and negative mains. The coils 133 and 204 are so wound that the coil 133 will move the armature 134 with much less current flowing than is necessary to cause the coil 204 to open contacts 205 and 206. The latter coil, however, is also so designed that it will open such contacts before serious damage results to the third electrode. By experiment it is found that serious damage will not result unless considerably greater current is passing through the circuit than required to operate coil 133. Other similar means for preventing damage to the third electrode or to the lamp itself will be readily apparent.

Having now described the various parts, such as the housing and the cooperating mechanism which accomplish the desired results, the following is a brief description of its operation. The housing and lamp mechanism as illustrated in Figs. 1, 2, and 3, forms one unit that can be applied to any picture machine and have any and all adjustments necessary for the proper focusing of the same with respect to the other operating parts of such complete machines as are now in use.

The lamp mechanism proper having been placed in the housing 15, the doors 26 and 27 closed, the current is then turned on by the operator from any point within the booth. The lamp being self striking through the operation of the automatic negative feed, it necessarily does not need his attention for starting up. The motor 29 and fan 30 then start to operate, likewise the feeding of the various ratchets 86 and 129 (magnet 96 being unexcited). The result is that the carriage carrying the negative carbon will feed upwardly until it contacts with the edge of the crater of the positive carbon, when instantly current will flow and the negative be withdrawn to strike and maintain the arc by the action of magnet 96 through ratchet 107 and pawl 92. The self focusing of the lamp by means of the third electrode will also come into operation. By the constant regulation of the current by means of the action of magnet 96 acting upon the ratchet controlling lever 102 causes the negative carbon carriage to be fed forward or backward constantly according to the current in the arc or other arc characteristic.

It will be noted that the position of the positive carbon is parallel to the lens system and the advantage of this is that the crater always stays in focus laterally at all times. Another advantage to be gained is that the crater is wholly exposed and by the constant rotation of the positive carbon an even crater is maintained in the center of the carbon.

If course it is understood that the constant passage of air past the motor below the lamp not only tends to cool the same but the air is forced by means of the fan upwardly thereby cooling the lamp mechanism as well as the lenses, the latter being in a frame that permits of the air circulating about all sides of the same. At the same time the fan causing the air to flow inwardly at 31 drives upwardly the heat, fumes, or the products of combustion, out through the openings 22, at the top of the drum or housing. Again, it may be found advantageous to carry such exhaust from the interior of the housing to the exterior of the booth, in which case it would only be necessary to extend a proper channel 220 from the top of the lamp housing to connect with such exterior as is shown in Fig. 15.

In accordance with the provisions of the patent statutes, herein is described the principle of operation of my invention, together with the apparatus which is now considered to represent the best embodiment thereof, but I desire to have it understood that the mechanism shown is only illustrative and that the invention can be carried out by other means without departing from the spirit and scope of the invention. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In an automatic arc lamp adapted to employ a pair of electrodes, a source of power, an operating member reciprocated thereby, a plurality of ratchets adapted to be actuated by said member, means connecting said ratchets with said electrodes for independently feeding each electrode, means resposive to the position of the arc for controlling the actuation of one ratchet, and means responsive to the arc length for controlling another ratchet.

2. In an automatic arc lamp adapted to employ a pair of electrodes, a source of power, an operating member reciprocated thereby, a plurality of ratchets adapted to be actuated by said member, means connecting said ratchets with said electrodes for rotating one of said electrodes and for independently feeding each electrode, means responsive to the position of the arc for controlling the actuation of one ratchet, and means responsive to the arc length for controlling another ratchet.

3. In a feeding and rotating means for electrodes, an operating member adapted to be reciprocated, a plurality of pawls carried thereby, a ratchet actuated by one of said pawls, means connecting said ratchet to one of said electrodes for rotating the electrode, a second ratchet actuated by another of said pawls, means connecting said second ratchet to another of said electrodes for feeding the same, a third ratchet actuated by another of said pawls, and means connecting said third ratchet to one electrode for feeding said electrode.

4. In a feeding and rotating means for electrodes, an operating member adapted to be reciprocated, a plurality of pawls carried hereby, a ratchet actuated by one of said pawls, means connecting said ratchet with one of said electrodes for rotating the same, a second ratchet actuated by another of said pawls, means connecting said second ratchet with said one of said electrodes for feeding the same, a third ratchet actuated by another of said pawls, means connecting said third ratchet with another electrode for feeding the same, and means for controlling the amount of feed.

5. In an automatic arc lamp adapted to employ electrodes, a source of power, an operating member reciprocated thereby, a plurality of ratchets adapted to be actuated by said member, means connecting said ratchets to said electrodes for independently feeding each electrode, a third electrode, means whereby said third electrode controls said member to actuate one ratchet, means responsive to the length of the arc, and means whereby said last-named means controls said member to actuate another of said ratchets.

6. In an arc lamp adapted to employ a pair of electrodes, a ratchet connected to each electrode for feeding the same, a ratchet connected with one of said electrodes for rotating the same, a plurality of pawls for actuating said ratchets, means for reciprocating said pawls, an electromagnet in series with the arc adapted to control the action of one of said pawls, an electromagnet adapted to control the action of another of said pawls, said last mentioned electromagnet being connected in a circuit including an element positioned adjacent the arc.

7. In an automatic arc lamp adapted to employ a pair of electrodes, a source of power, an operating member reciprocated thereby, means including a plurality of ratchets for feeding said electrodes, and means for operating said member to actuate said ratchets selectively.

8. In an automatic arc lamp adapted to employ a pair of electrodes, a source of power, an operating member reciprocated thereby, means including a plurality of ratchets for feeding said electrodes, and means responsive to the position of the arc and to the arc length for operating said member to actuate said ratchets selectively.

In testimony whereof I have affixed my signature.

THEODORE HALL.